United States Patent
Denton

(10) Patent No.: US 9,964,034 B2
(45) Date of Patent: May 8, 2018

(54) METHODS FOR PRODUCING A FUEL GAS STREAM

(71) Applicant: Robert D. Denton, Bellaire, TX (US)

(72) Inventor: Robert D. Denton, Bellaire, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 469 days.

(21) Appl. No.: 14/671,029

(22) Filed: Mar. 27, 2015

(65) Prior Publication Data

US 2015/0292403 A1 Oct. 15, 2015

Related U.S. Application Data

(60) Provisional application No. 61/977,513, filed on Apr. 9, 2014.

(51) Int. Cl.
| | | |
|---|---|---|
| *F02C 1/00* | (2006.01) | |
| *F02C 3/20* | (2006.01) | |
| *C10L 3/10* | (2006.01) | |

(52) U.S. Cl.
CPC .............. *F02C 3/20* (2013.01); *C10L 3/103* (2013.01); *C10L 3/104* (2013.01); *C10L 3/106* (2013.01); *F05D 2220/75* (2013.01)

(58) Field of Classification Search
USPC ....... 60/39.02, 39.06, 39.12, 39.465, 39.461, 60/645, 683, 723, 772, 775, 781; 62/612, 62/313, 614
See application file for complete search history.

(56) References Cited

U.S. PATENT DOCUMENTS

| | | | |
|---|---|---|---|
| 5,401,282 A * | 3/1995 | Leininger | C10J 3/06 252/373 |
| 5,718,872 A | 2/1998 | Khanmamedov | 422/168 |
| 6,551,570 B1 | 4/2003 | Smith et al. | 423/574.1 |
| 7,429,287 B2 | 9/2008 | Frantz | 95/49 |
| 8,298,505 B2 | 10/2012 | Zhai et al. | 423/574.1 |
| 8,354,082 B2 * | 1/2013 | Frydman | C10J 3/86 422/630 |
| 2003/0196452 A1* | 10/2003 | Wilding | F25J 1/0201 62/613 |
| 2004/0177646 A1* | 9/2004 | Wilkinson | F25J 1/0201 62/614 |
| 2010/0058801 A1* | 3/2010 | Masani | F01D 15/005 62/611 |
| 2010/0147022 A1 | 6/2010 | Hart et al. | 62/601 |
| 2012/0036888 A1* | 2/2012 | Vandor | F25J 1/0022 62/613 |

* cited by examiner

*Primary Examiner* — Binh Q Tran
(74) *Attorney, Agent, or Firm* — ExxonMobil Upstream Research Company Law Department

(57) ABSTRACT

Methods and systems for dynamically planning a well site are provided herein. Methods include flowing a raw gas stream though a suction scrubber to form a feed gas stream and compressing the feed gas stream to form a compressed gas stream. Methods include cooling the compressed gas stream in a cooler to produce a cooled gas stream. Methods include feeding the cooled gas stream into a gas treatment system, using a turboexpander, to produce a conditioned gas and a waste stream. Methods include heating the conditioned gas in a heat exchanger, where the conditioned gas is a superheated, sweetened, gas. Methods also include burning the conditioned gas in a turbine generator and mixing the waste stream into the raw gas stream upstream of the suction scrubber.

33 Claims, 6 Drawing Sheets

<u>100</u>

300

600

METHODS FOR PRODUCING A FUEL GAS STREAM

CROSS REFERENCE TO RELATED APPLICATIONS

This application claims the priority benefit of U.S. patent application No. 61/977,513 filed Apr. 9, 2014 entitled METHODS FOR PRODUCING A FUEL GAS STREAM, the entirety of which is incorporated by reference herein.

FIELD

The present techniques are generally related to gas purification. In particular, the present techniques provide for purification of a raw natural gas to be utilized as a fuel gas during offshore production.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

To meet increasing energy demand, oil and gas will continue to be a major source for the energy needs of the world. Specifically, offshore hydrocarbon production is critical in meeting that growing demand. In the 1940's, offshore production began in the state of Louisiana and advancements in technology have expanded the industry into deeper waters and into more remote locations. Over the last six decades, offshore production has increased tremendously. Currently, approximately 30% of the world oil and gas production comes from offshore production and this percentage is expected to increase in the future.

During offshore hydrocarbon production, crude oil and raw natural gas produced from a well is harvested from underground reservoirs to be brought to the surface. Additional, processing may separate the raw natural gas from the crude oil. In many cases, the raw natural gas contains unacceptable levels of higher hydrocarbons, e.g., carbon dioxide ($CO_2$), hydrogen sulfide ($H_2S$), and other impurities, so that it cannot be burned as a fuel on the platform without initially undergoing further processing.

For example, impure concentrations of $H_2S$ or $C_{3+}$ in the raw natural gas may cause corrosion and carbon build-up in most offshore production equipment. Additionally, high levels of $CO_2$ in the raw natural gas may lower the BTU value of the fuel gas. These impurities may compromise engine operation, increase operational downtime, or emit harmful emissions into the environment. However, despite the presence of the contaminants and impurities in the raw gas that may render the use of the gas as undesirable, the raw natural gas may be the only fuel available to operate power generators, turbines, and compressor stations in remote locations and on offshore platforms. Thus, facilities to condition the raw natural gas may be implemented during offshore production.

U.S. Patent Application Publication No. 2010/0147022 by Hart et al. discloses a process for the removal of a sour species from a dehydrated natural gas feed stream. The dehydrated natural gas feed stream is cooled to conditions where a slurry of solid sour species and hydrocarbon liquids is formed together with a gaseous stream containing gaseous sour species. The gaseous stream containing gaseous sour species is then separated from the slurry and treated with a liquid solvent, thereby forming a liquid solution of the sour species and a dehydrated sweetened natural gas product stream. An apparatus for removing sour species from a dehydrated natural gas feed stream may include a vessel with a solids formation zone in fluid communication with a gas solvation zone. The solids formation zone is configured to facilitate formation of a slurry of solid sour species and hydrocarbon liquids and a gaseous stream containing gaseous sour species. The gas solvation zone is configured to facilitate formation of a liquid solution of sour species. The apparatus has an inlet for introducing the dehydrated natural gas feed stream to the solids formation zone, a conduit configured to direct the gaseous stream from the solids formation zone to the gas solvation zone, and an inlet for introducing liquid solvent into the gas solvation zone.

U.S. Pat. No. 5,718,872 to Khanmamedov discloses an apparatus for controlling the hydrogen sulfide concentration in an acid gas stream and the hydraulic loading of a sulfur recovery unit of the type having an absorber for contacting a sour gas stream with an absorbent, a regenerator for regenerating the absorbent to form an acid gas stream and a recycle system.

U.S. Pat. No. 6,551,570 to Smith et al. discloses the removal of hydrogen sulfide from gas streams by reacting the hydrogen sulfide with sulfur dioxide to produce sulfur. The reaction is effected in a reaction medium comprising a non-aqueous Lewis base with a $pK_b$ value of about 6 to about 11. The reaction medium possesses a specific combination of properties: a) absorbs sulfur dioxide and reacts chemically therewith to form a reaction product; b) absorbs hydrogen sulfide; c) removes the hydrogen sulfide from the gas stream through contact of the gas stream with the reaction medium in the presence of free sulfur dioxide, and/or the reaction product; d) acts as a catalyst for the overall reaction of the hydrogen sulfide with sulfur dioxide to produce sulfur; and e) has the capacity to absorb sulfur dioxide.

U.S. Pat. No. 7,429,287 to Frantz discloses a method and a system for sweetening a raw natural gas feed stream using a multi-stage membrane separation process. The method and system also include use of a gas turbine which operates with an impure fuel gas as derived from a permeate gas stream obtained in at least the second stage of a membrane separation process, or later stages if more than two stages are employed. In embodiments, the gas turbine is coupled with an electrical generator, which generates electrical power that drives a compressor for the second stage (or higher) of the membrane separation process, as well as other process equipment associated therewith, such as air coolers and process pumps. Alternatively, the gas turbine can be coupled mechanically to the compressor employed. In other embodiments, the power generated by the turbine generator combination can be exported to a local power grid. In other embodiments, the turbine generator is a micro-turbine generator (MTG) which can be used in applications where space is limited, such as an offshore platform or other oil/gas production facility or on board a floating vessel.

U.S. Pat. No. 8,298,505 to Zhai et al. discloses a process for treating a gas stream comprising hydrogen sulfide. The process includes the steps of mixing a first gas stream comprising hydrogen sulfide with a second stream comprising sulphur dioxide to produce a combined stream, whereby elemental sulphur is produced by a reaction between the hydrogen sulfide and the sulphur dioxide. The process includes the step of removing elemental sulphur, and optionally water, from the combined stream. The process also includes the step of oxidizing at least some of the elemental sulphur to form sulphur dioxide for use in the second stream, where the reaction is conducted at a temperature of from 15° C. to 155° C. and a pressure of at least 3 MPa.

Additionally, other gas treating processes may exist for the purification of gas. However, the currently available systems take up significant space and are difficult to operate in remote locations.

SUMMARY

An exemplary embodiment provides a method for producing a fuel gas stream. The method includes flowing a raw gas stream though a suction scrubber to form a feed gas stream and compressing the feed gas stream to form a compressed gas stream. The method includes cooling the compressed gas stream in a cooler to produce a cooled gas stream. The method includes feeding the cooled gas stream into a gas treatment system, using a turboexpander, to produce a conditioned gas and a waste stream. The method includes heating the conditioned gas in a heat exchanger, where the conditioned gas is a superheated, sweetened fuel gas. The method also includes burning the conditioned gas in a turbine generator and mixing the waste stream into the raw gas stream upstream of the suction scrubber.

Another exemplary embodiment provides a system for producing a fuel gas stream. The system includes a suction scrubber to form a feed gas stream from a raw gas stream and a compressor to form a compressed gas stream from the feed gas stream. The system includes a cooling water system to cool the compressed gas stream to produce a cooled gas stream. The system includes a gas treatment system, including an expansion device and a low temperature separation step, to remove contaminants from the cooled gas stream to produce a fuel gas and a waste stream, where the waste stream is mixed into the raw gas stream upstream of the suction scrubber. The system also includes a heat exchanger to superheat the fuel gas to produce a superheated, sweetened gas and a turbine generator to combust the superheated, sweetened gas.

Another exemplary embodiment provides a method for producing a fuel gas from a compressed natural gas. The method includes flowing raw natural gas through a suction scrubber to form a natural gas feed and compressing the natural feed gas to form a compressed natural gas. The method includes cooling the compressed natural gas in a cooler to produce a cooled natural gas. The method includes feeding the cooled natural gas into a gas treatment system, including a low-temperature separator, to produce a natural gas stream and a waste stream. The method includes heating the natural gas stream in a heat exchanger to form a superheated, sweetened natural gas. The method includes combusting the superheated, sweetened natural gas in a turbine generator for use as an energy source. The method also includes mixing the waste stream into the raw natural gas located upstream of the suction scrubber.

DESCRIPTION OF THE DRAWINGS

The advantages of the present disclosure are better understood by referring to the following detailed description and the attached drawings, in which.

DETAILED DESCRIPTION

Figure 1:
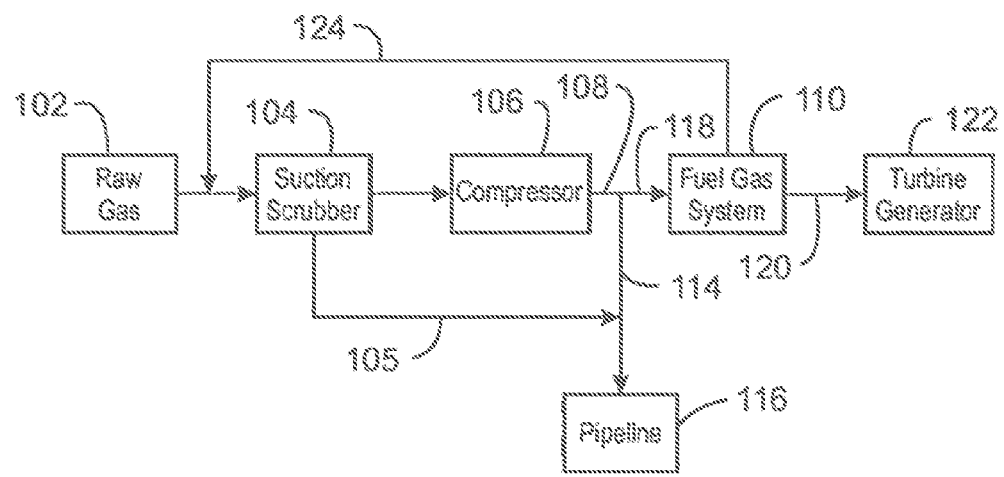
FIG. 1 is a block diagram of a gas conditioning and partial sweetening system in accordance with one or more embodiments of the present disclosure.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The term "conditioned gas" refers to a purified gas where a percentage of higher molecular weight hydrocarbon contaminants in an initial hydrocarbon stream has been removed. "Conditioned gas" is also referred to as a "fuel gas."

The term "feed stream" refers to a composition prior to any treatment, such treatment including cleaning, dehydration, and/or scrubbing.

The term "gas treatment system" refers to the process described herein, which removes a sufficient percentage of the compounds from the feed stream, so that the product can be used as a fuel on a production platform.

The term "raw gas stream" refers to a hydrocarbon fluid stream wherein the fluids are primarily in a gaseous phase, and which has not undergone steps to remove carbon dioxide, hydrogen sulfide, or other acidic components.

The terms "substantially", "substantial," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The term "superheated" means warming a gas above the saturation or dew point.

The term "sweetened gas" refers to a fluid stream in a substantially gaseous phase where at least a portion of acid gas components have been removed.

The term "waste gas" or "waste stream" refers to any gas stream comprising $CO_2$, $H_2S$, higher molecular weight hydrocarbons, or any other type of impurities and contaminants removed from the feed gas to produce a hydrocarbon product suitable for use as a fuel.

Overview

The embodiments of the present disclosure provide methods and systems for purifying a raw natural gas to produce a fuel gas stream. The method may include a suction scrubber to initially separate out liquids and entrained solids within the raw natural gas to produce a feed gas. The feed gas may be compressed to produce a compressed feed gas where a portion of the compressed feed gas is fed into a fuel gas treatment system for purification. Another portion of the compressed feed gas may bypass the fuel gas treatment system and may be sent to a pipeline for sale.

The fuel gas treatment system is utilized to split the compressed feed gas into a waste stream and a low-sulfur conditioned gas stream. The conditioned gas stream may be directed into a turbine generator for combustion as an energy source or used for any other fuel purpose or some other process purpose. The waste stream is fed back into the raw natural gas upstream of the suction scrubber.

FIG. 1 is a block diagram of a gas conditioning and partial sweetening system 100 in accordance with one or more embodiments of the present disclosure. The system 100 may begin by directing a raw gas 102 into a suction scrubber 104, such as a knockout drum, among others. The suction scrubber 104 may be utilized to separate, collect, and remove liquids 105 from the raw gas 102 prior to entering a compressor 106. By removing the liquids 105, the suction scrubber 104 may act to prevent the liquids 105 from entering the compressor 106, which may increase the longevity of the component life of the compressor 106 and other downstream equipment. The suction scrubber 104 may be located between an upstream raw gas supply and an inlet nozzle of the compressor 106 so as to be upstream of the compressor 106.

The compressor 106 may form a compressed feed gas 108 and may further purify the compressed feed gas 108 by removing any impurities. The type of compressor utilized may depend on the gas pressure required downstream for a fuel gas system 110. In operation, the compressor may utilize a turbine, a motor, or an engine for power generation.

A majority portion 114 of the compressed feed gas 108, e.g., greater than about 85%, about 90%, about 95%, or more, is sent to a pipeline 116 for processing at a facility, such as an onshore facility. The liquids 105 removed by the suction scrubber 104 may be joined with this flow to be separated and disposed at the onshore facility. However, a smaller portion 118 of the compressed feed gas 108, e.g., about 15%, about 10%, about 5%, or less, may be directed into the fuel gas system 110 to undergo additional treatment. In one or more embodiments, the smaller portion 118 of the compressed feed gas 108 that may be directed into the fuel gas system 110 may include less than about 15%, about 10%, about 5% or less of the compressed feed gas 108 produced by the compressor 106.

The fuel gas system 110 may be an expansion system utilized to liquefy, separate, and remove residual concentrations of contaminants, including $CO_2$ and $H_2S$, that may be present in the compressed feed gas 108. In particular, the fuel gas system 110 may expand the smaller portion 118 of the compressed feed gas 108 to cool the compressed feed gas 108 and condense out heavier hydrocarbons and acid gases. In operation, the refrigeration step of the fuel gas system 110 may cause the condensation of contaminants from the smaller portion 118 of the compressed feed gas 108, where the contaminants may be later separated and removed. A fuel gas product, e.g., a conditioned gas 120, may exit the fuel gas system 110 where it may be combusted in a turbine generator 122. Additionally, a waste stream 124 may exit the fuel gas system 110. The waste stream 124 may contain some natural gas, along with the other contaminants, such as the heavier hydrocarbons and acid gases, that can be recycled into the raw gas 102, located upstream of the suction scrubber 104. The portion of the conditioned gas 120 directed into the turbine generator 122 may include less than about 15%, 10%, or 5% of the gas sent into the pipeline 116, but substantially more gas than is in the waste stream 124.

Figure 2:
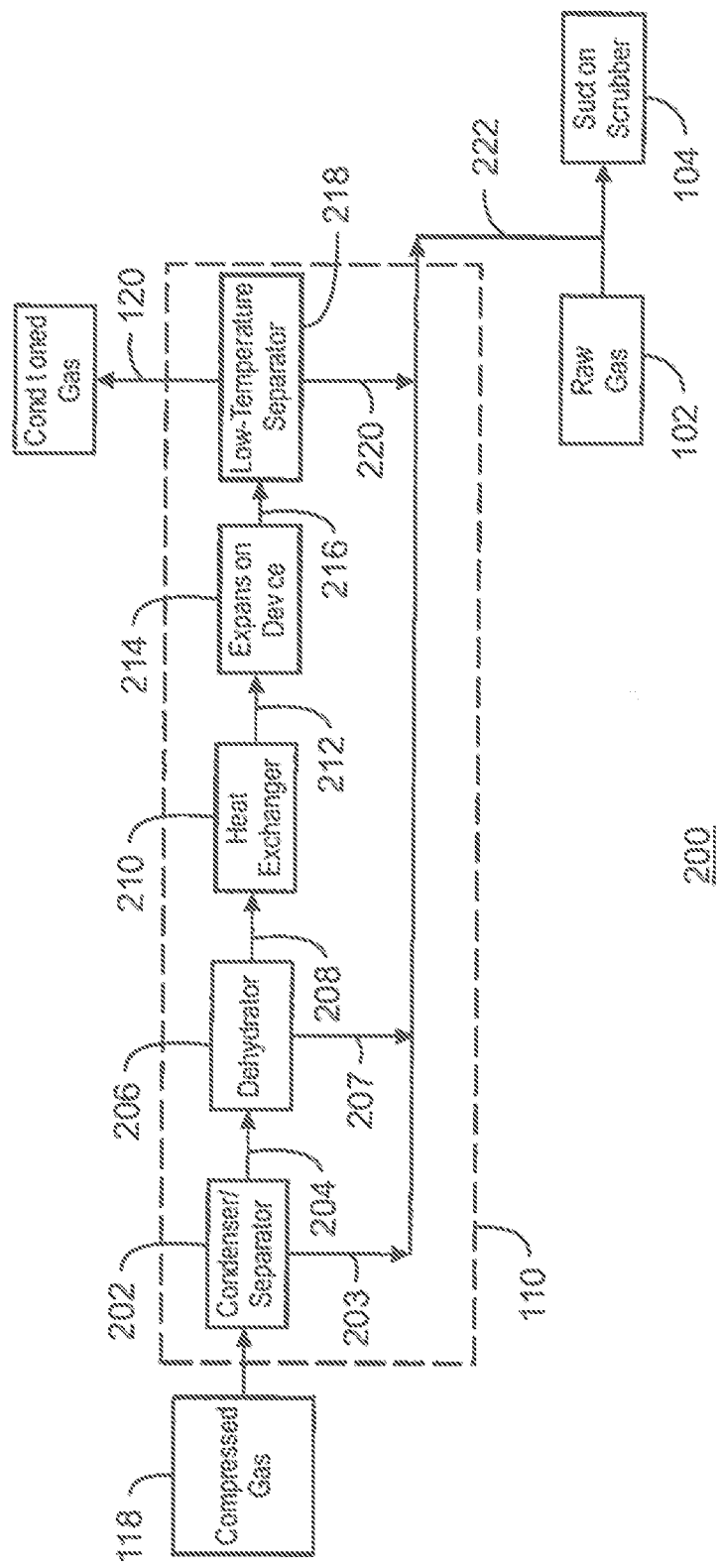
FIG. 2 is a block diagram of a detailed gas conditioning and partial sweetening system in accordance with one or more embodiments of the present disclosure.

FIG. 2 is a block diagram of a detailed gas conditioning and partial sweetening system 200 in accordance with one or more embodiments of the present disclosure. Like numbers are described with respect to FIG. 1. A compressed gas 108 enters the fuel gas system 110 and flows into a condenser/separator 202. In the condenser/separator 202, the compressed gas 108 is cooled to condense and separate out droplets of liquids to form a waste stream 203 and a cooled gas stream 204. Typical contaminants that may be removed in the waste stream 203 may include water, liquid hydrocarbons, well treating compounds, pipeline treating chemicals, and compressor oils. The removal of such contaminants may be beneficial before the cooled gas stream 204 is further processed downstream. For example, if the contaminants are allowed to proceed further through the fuel gas system 110, they may cause a number of operational problems including foaming, equipment fouling, and high corrosion rates.

The cooled gas stream 204 may enter a dehydrator 206 to remove water. In particular, dehydration may be required to prevent the formation of ice or hydrates that may plug downstream equipment leading to possible equipment malfunction and failure. Thus, the dehydrator 206 may aid in preventing flow restrictions and plugging in process conduits, e.g. valves and pipelines, and possibly in preventing corrosion formation on metal surfaces. The removal of the contaminants forms a rejected water stream 207 and a dry gas stream 208. In one or more embodiments, the dehydrator 206 may be a glycol dehydrator, a molecular sieve dehydrator, a deliquescent, or any other type of dehydrator.

The dry gas stream 208 flows into a heat exchanger 210. In operation, the heat exchanger 210 may exchange the heat of the dry gas stream 208 with other fluid streams to chill the dry gas stream 208 and to generate a chilled gas stream 212. This will be discussed in greater detail with respect to FIG. 4. The chilled gas stream 212 exiting the heat exchanger flows into an expansion device 214. The expansion device 214 reduces the pressure, further cooling the chilled gas stream 212 and condensing out other contaminants, such as natural gas liquids (NGLs) and other contaminated entrained liquids, from the chilled gas stream 212. A cold stream 216 flows from the expansion device 214 and into a cold separator, e.g., a low-temperature separator 218. The low-temperature separator 218 is used to separate the cold stream 216 into its respective liquid and vapor phases. In particular, the low-temperature separator 218 separates out a conditioned gas 120.

The conditioned gas 120 may be used as an energy source on an offshore platform or other remote locations. The conditioned gas 120 exiting the low-temperature separator 218 may include more than about 60%, about 75%, about 90%, or more of the total gas passing through the fuel gas system 110.

A recycle stream 220 may exit the low-temperature separator 218 and may be combined with the waste stream 203 and the rejected water stream 207. The combined streams 222 may flow into a raw gas 102 located upstream of a suction scrubber 104 to undergo another cycle of compression and purification.

Figure 3:
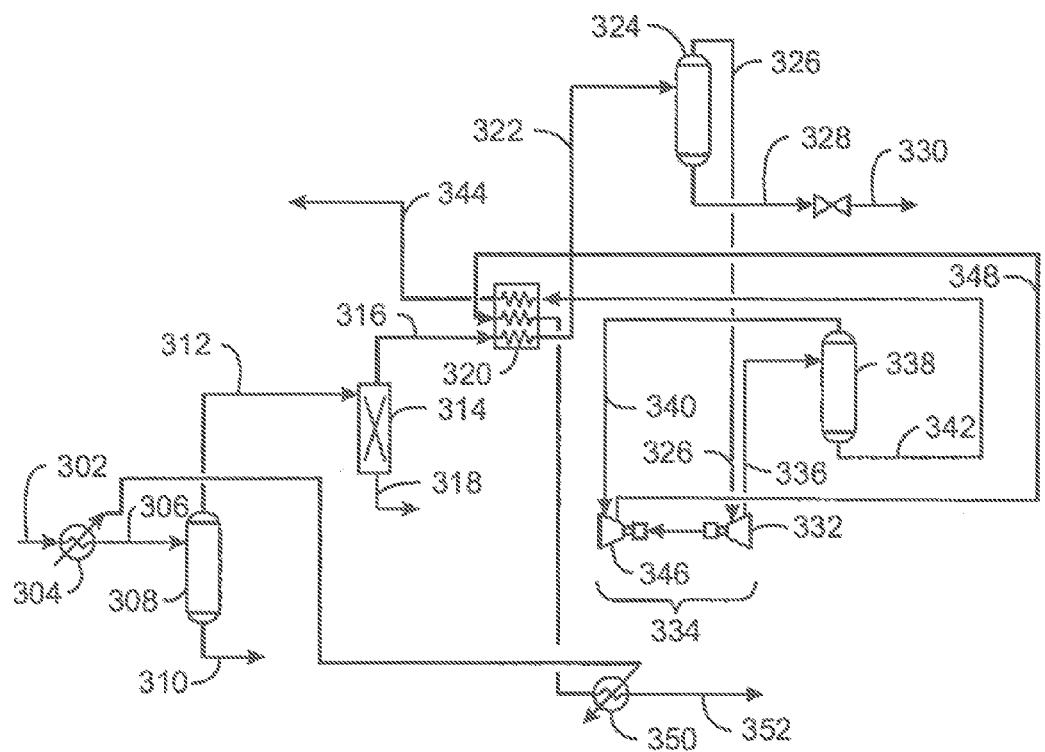
FIG. 3 is a drawing of a first embodiment of a gas conditioning and partial sweetening system for producing a fuel gas in accordance with one or more embodiments of the present disclosure.

FIG. 3 is a drawing of a first embodiment of a gas conditioning and partial sweetening system 300 for producing a fuel gas in accordance with one or more embodiments of the present disclosure. A compressed gas 302 is used as the feed gas to the fuel gas system 300. The compressed gas 302 is initially cooled by entering a heat exchanger 304. The compressed gas 302 may be at a pressure of about 1,900 psia and a temperature of about 150° F. (66° C.). The heat exchanger 304 may lower the temperature of the compressed gas 302 to about 80° F. (26.6° C.) to form a cool compressed gas 306. In one or more embodiments, the heat exchanger 304 may be a gas/gas shell-and-tube heat exchanger 304 where the compressed gas 302 may cool on the tube side of the heat exchanger 304 against a chilled fuel gas flowing on the shell side. The tubes of the heat exchanger 304 may be made of stainless steel since a portion of water may condense out of the compressed gas 302 during cooling.

The cool compressed gas 306 may flow into a high-pressure knock-out drum 308, which acts as a separator and removes any droplets of liquids 310 from the cool compressed gas 306, such as water and other liquids. The disposal of the liquids 310 is further discussed with respect to FIG. 4. Typical liquid contaminants may include liquid hydrocarbons, salt water, well treating compounds, pipeline treating chemicals, and compressor oils.

A vapor stream 312 from the high-pressure knock-out drum 308 enters into a dehydration unit 314 where substantially all of the remaining water vapor is removed to produce a dry gas 316. The dehydration unit 314 may be a molecular sieve unit utilized to reject a water stream 318. In some embodiments, the dehydrator 314 may include an enhanced absorption process (e.g. Super DRIZO™ glycol dehydration) or another adsorption process to remove the water vapor down to the level required for operation of the subsequent downstream cryogenic conditioning.

The dry gas 316 flows into a main heat exchanger 320 where it is chilled to produce a dry cold gas 322. As the system 300 may be located at a remote site, such as an offshore platform, the main heat exchanger 320 may be a compact design including a brazed aluminum heat exchanger (BAHX) or a printed circuit exchanger (PCHE), where both types of heat exchangers may be suitable for high-pressure service. The dry cold gas 322 may be fed into an expander device 324, such as a knockout drum, to ensure the removal of any trace liquids that may interrupt or damage downstream equipment and to produce a cold vapor 326. As will be discussed in greater detail with respect to FIG. 4, a high-pressure liquid 328 removed from the expander device 324 may be flashed to produce a low-pressure liquid 330, which may be utilized for other processes or returned to a feed gas inlet.

The pressure and the temperature of the cold vapor 326 drops as it passes through the expander side 332 of a compander 334. The cold vapor 326 undergoes a near isentropic expansion via the expander side 332 to form a lower pressure two-phase fluid 336 including both vapor and liquid phases. The resulting two-phase fluid 336 enters a low-temperature separator 338 at a pressure just above the pressure of the low-temperature separator 338 to separate the two-phase fluid 336 into its vapor phase and liquid phase components.

The vapor phase from the low-temperature separator 338 is a cold fuel gas 340. The liquid phase component from the low-temperature separator 338 is a low-temperature liquid 342, which is richer in heavier hydrocarbons and $H_2S$ than the inlet two-phase fluid 336. The low-temperature liquid 342 is then partially vaporized in the main heat exchanger 320 to near ambient temperature (e.g., about 79° F. (26° C.)) to produce a vaporized liquid 344. As will be discussed in greater detail with respect to FIG. 4, the vaporized liquid 344 may mix with a raw gas stream located upstream of a compressor suction scrubber.

The cold fuel gas 340 passes through the compressor side 346 of the compander 334, where it is compressed to a required pressure suitable for use as fuel gas 348 to be used on an offshore platform. The fuel gas 348 is a conditioned gas since heavier hydrocarbon components, such as $C_{3+}$, and acid gases, such as $H_2S$ and $CO_2$, have been significantly removed from the initial feed gas. The compressed fuel gas 348 is superheated in the main heat exchanger 320 and additionally heated in a heat exchanger 350 to produce a superheated, sweetened fuel gas 352 suitable for offshore platform usage. Superheated may be defined to include warming the compressed fuel gas 348 above its dew point. The superheated, sweetened fuel gas 352 may be utilized to produce electricity via combustion in a turbine generator or used for other purposes in a combustion engine or heater.

Figure 4:
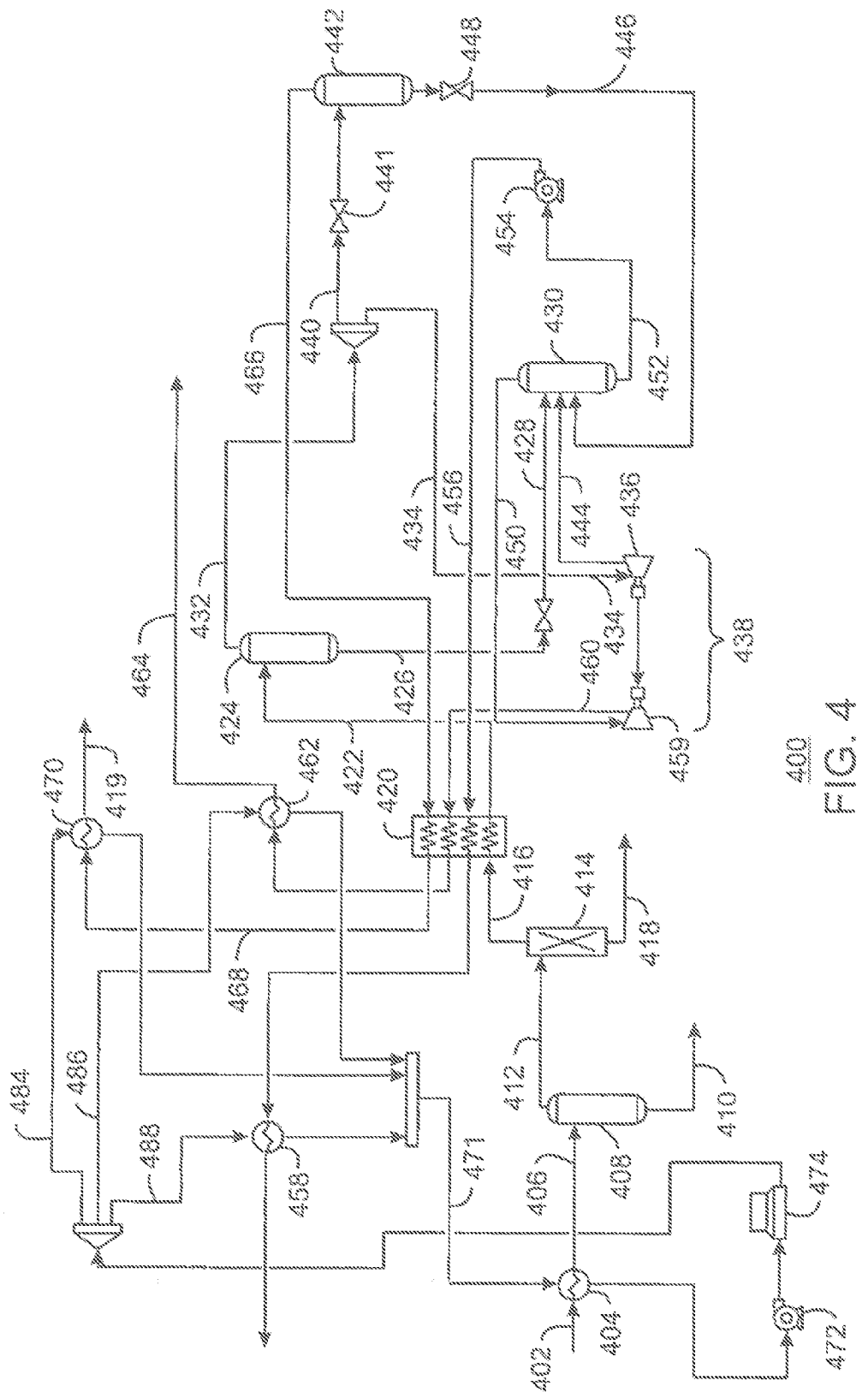
FIG. 4 is a drawing of a second embodiment of a gas conditioning and partial sweetening system for producing a fuel gas in accordance with one or more embodiments of the present disclosure.

FIG. 4 is a drawing of a second embodiment of a gas conditioning and partial sweetening system 400 for producing a fuel gas in accordance with one or more embodiments of the present disclosure. A compressed gas 402 is used as the feed gas to the fuel gas system 400. The compressed gas 402 enters the system 400 at a relatively high pressure (e.g., 1,900 psia) and at a temperature of about 150° F. (66° C.) and may flow into a chiller 404, where its temperature is lowered to about 80° F. (26.6° C.), in this embodiment. The cool compressed gas 406 may flow into a high-pressure knock-out drum 408 to remove and to separate any liquids 410, including water and hydrocarbons, within the cool compressed gas 406. The removed liquids 410 from the high-pressure knock-out drum 408 may be disposed of by flashing the liquids 410 into a compressor suction scrubber located downstream of the raw gas inlet.

An overhead vapor stream 412 from the high-pressure knock-out drum 408 enters into a dehydration unit 414 where substantially all of the remaining water vapor may be removed to produce a dry gas 416. The dry gas 416 may be suitable for use in a downstream cryogenic portion of the system 400. An adsorbed water stream 418 may be removed from the dehydration unit 414 using a superheated regeneration gas 419.

The dry gas 416 flows into a main heat exchanger 420 where it is chilled to about −15° F. (−26.1° C.), or below, to produce a dry cold fluid 422. The dry cold fluid 422 may contain contaminants such as $CO_2$, $H_2S$, and mercaptans that are condensed into liquids within the main heat exchanger 420.

Accordingly, the dry cold fluid 422 may be fed into an expander device 424, such as a knock-out drum, for removal of any entrained liquids 426. The entrained liquids 426 removed from the expander device 424 may be flashed to produce a lower pressure stream 428. The lower pressure stream 428 may be throttled into a low-temperature separator 430 for additional processing.

A cold vapor 432 exits the expander device 424 as an overhead product. The high-pressure cold vapor 432 may split into a first stream 434, which enters an expander side 436 of a compander 438, and a second stream 440. The second stream 440 may flash through a pressure letdown valve 441 and into a regeneration gas separator 442.

The expander 436 chills and depressures the first stream 434 using a near isentropic expansion to form a cold two-phase fluid 444. In one or more embodiments, the cold two-phase fluid 444 exits the expander 436 with a drop in pressure of at least about 1,420 psia and a drop in temperature of at least about −115° F. (−81.6° C.). The near isentropic pressure drop of the first stream 434 provides the necessary refrigeration to condense the contaminant-rich liquid phase present in the cold two-phase fluid 444.

The cold fluid 444 enters the low-temperature separator 430 at a pressure just above the pressure of the low-temperature separator 430, which may operate at a pressure of about 350 psia. Within the low-temperature separator 430, the cold two-phase fluid 444 may mix with the lower pressure stream 428 and a two-phase fluid, or recovered liquids 446, recovered from the regeneration gas separator 442. In one or more embodiments, a valve 448 may be placed upstream of the recovered liquids 446 to reduce its pressure before entering the low-temperature separator 430, which operates at a lower pressure. The low-temperature separator 430 separates the phases of the streams 426, 428, 444 to produce a cold fuel gas 450 and low-temperature liquids 452.

The pressure of the low-temperature liquids 452, which are rich in heavier hydrocarbons and $H_2S$, may be increased via a pump 454 so that the low-temperature liquids 452 may readily move through the system 400. Additionally, the increase in pressure may aid in providing a pressure level suitable for mixing of the low temperature liquids 452 with a raw gas stream located upstream of a compressor suction scrubber. After the low-temperature liquids 452 are re-pressurized, liquids 456 are partially vaporized and heated in the main heat exchanger 420 and further heated in a chiller 458 prior to entry into a raw gas stream upstream of a compression suction scrubber.

The cold fuel gas 450 passes through the compressor side 459 of the compander 438 where the pressure is increased for suitable use as a fuel gas on an offshore platform. In one or more embodiments, a suitable pressure may be about 805 psia. In operation, a compressed cold fuel gas 460, after leaving the compressor 459, is heated to about 55° F. (12.7° C.) in the main heat exchanger 420 and again in a chiller 462 to about 115° F. (46° C.) to generate a superheated, sweetened fuel gas 464. The compressed cold fuel gas 460 may be a conditioned gas since heavier hydrocarbon components, such as $C_{3+}$, and acid gases, such as $H_2S$ and $CO_2$, have been substantially removed from the initial feed gas, e.g., the compressed gas 402. The supply pressure of the superheated, sweetened fuel gas 464 may be about 785 psia. This pressure rating may be suitable for use in a gas turbine and other fuel gas consuming devices located on an offshore platform.

In one or more embodiments, the second stream 440 of high-pressure cold vapor that entered the regeneration gas separator 442 may be used to produce a cold regeneration gas 466 and the recovered liquids 446. As previously mentioned, the recovered liquids 446 may be flashed into the low-temperature separator 430. The cold regeneration gas 466 may flow overhead of the regeneration gas separator 442 and into the main heat exchanger 420. A heated regeneration gas 468 may be generated and further heated in a chiller 470. The superheated regeneration gas 419 may exit the fuel gas system 400 at a temperature of about 95° F. (35° C.) and a pressure of about 910 psia. The superheated regeneration gas 419 may then be heated to about 450° F. (232° C.) in a heater to regenerate the dehydrator 414, as previously discussed. The series of chillers 458, 462, and 470 may be part of a cooling water loop. The cooling water loop may use the refrigeration potential of the low-temperature liquids 452, the cold fuel gas 450, and the cold regeneration vapor 466 to chill a cooling fluid 471 before it flows into the high-pressure knock-out drum 408.

As shown in FIG. 4, the cooling fluids of the series of chillers 458, 462, 470 may be combined to generate the cooling fluid 471 (e.g. water, glycol/water). The cooling fluid 471 may be chilled by the chiller 404, pressurized by a pump 472, and chilled in an air cooler 474 to a temperature of about 140° F. (60° C.). The cooling fluid 471 may then be returned to the chillers 458, 462 and 470 as individual streams 484, 486, and 488, respectively. In one or more embodiments, the individual streams 484, 486, 488 may be packaged in separate tube bundles within a single heat exchanger shell(s).

Figure 5:
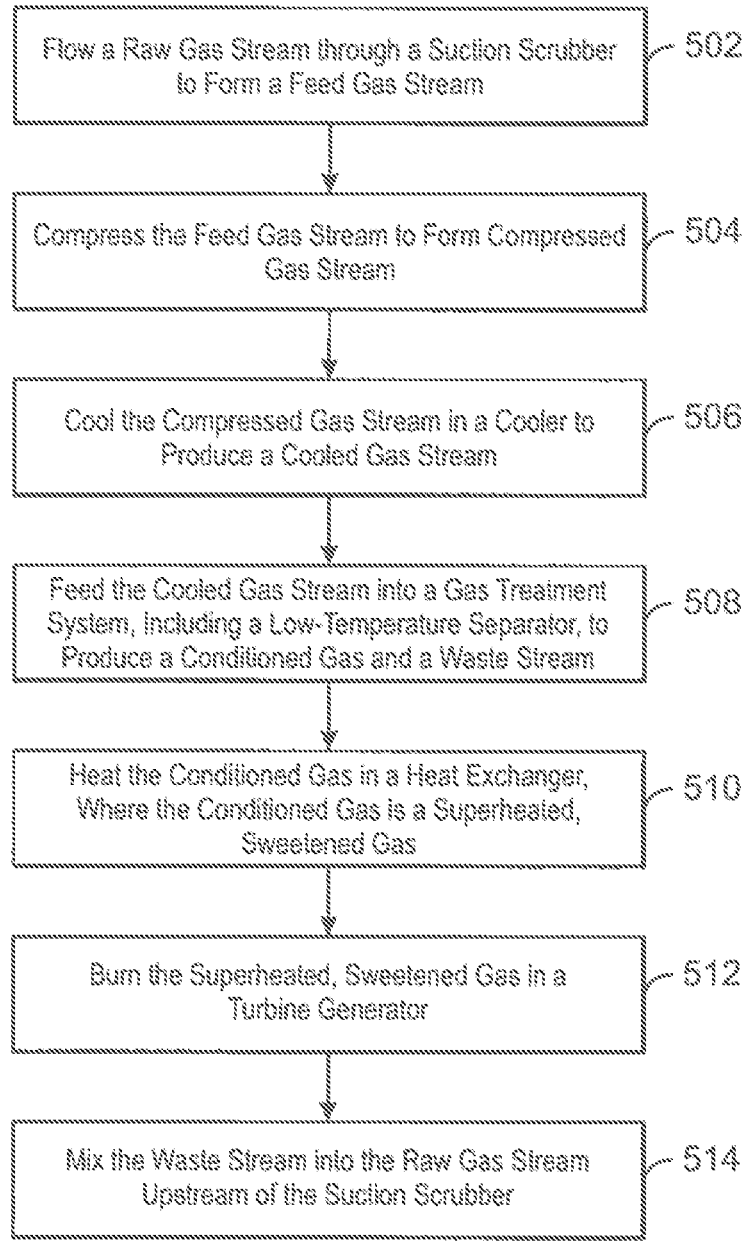
FIG. 5 is a block diagram for a method of producing a fuel gas stream in accordance with one or more embodiments of the present disclosure.

FIG. 5 is a block diagram 500 for a method of producing a fuel gas stream in accordance with one or more embodiments of the present disclosure. The method begins at block 502 where a raw gas stream may flow into a suction scrubber to form a feed gas stream. The raw gas stream may flow from a hydrocarbon well reservoir and may include various contaminants that may be separated and removed before the raw gas stream is useable as a feed gas stream. At block 504, the feed gas stream may be compressed to form a compressed gas stream. Compressing the feed gas stream may also facilitate movement of the feed gas stream during additional processing steps. At block 506, the compressed gas stream may be cooled in a cooler to produce a cooled gas stream. At block 508, the cooled gas stream may be fed into a gas treatment system to remove liquid containments. The gas treatment system may include a low-temperature separator to produce both a conditioned gas and a waste stream. The gas treatment system may be a cryogenic fuel gas system, where the term "cryogenic" may refer to a system that operates at temperatures below −55° F. (−48.3° C.), and utilizes refrigeration methods to condense gases. The gas treatment system may only purify a smaller portion of the compressed gas stream, as a majority portion of the compressed gas stream may be directed to a pipeline for additional purification or commercialization. In some embodiments, the percentage of compressed gas that is purified may include less than about 20%, less than about 15%, less than about 10%, or less than about 5%.

At block 510, after sufficient liquids have been removed, the conditioned gas may be heated in a heat exchanger to generate a superheated, sweetened fuel gas. At block 512, the superheated, sweetened fuel gas may be utilized as an energy source for a remote offshore platform by being burned in a turbine generator. At block 514, the waste stream may mix with the raw gas stream upstream of the suction scrubber for additional purification.

Figure 6:
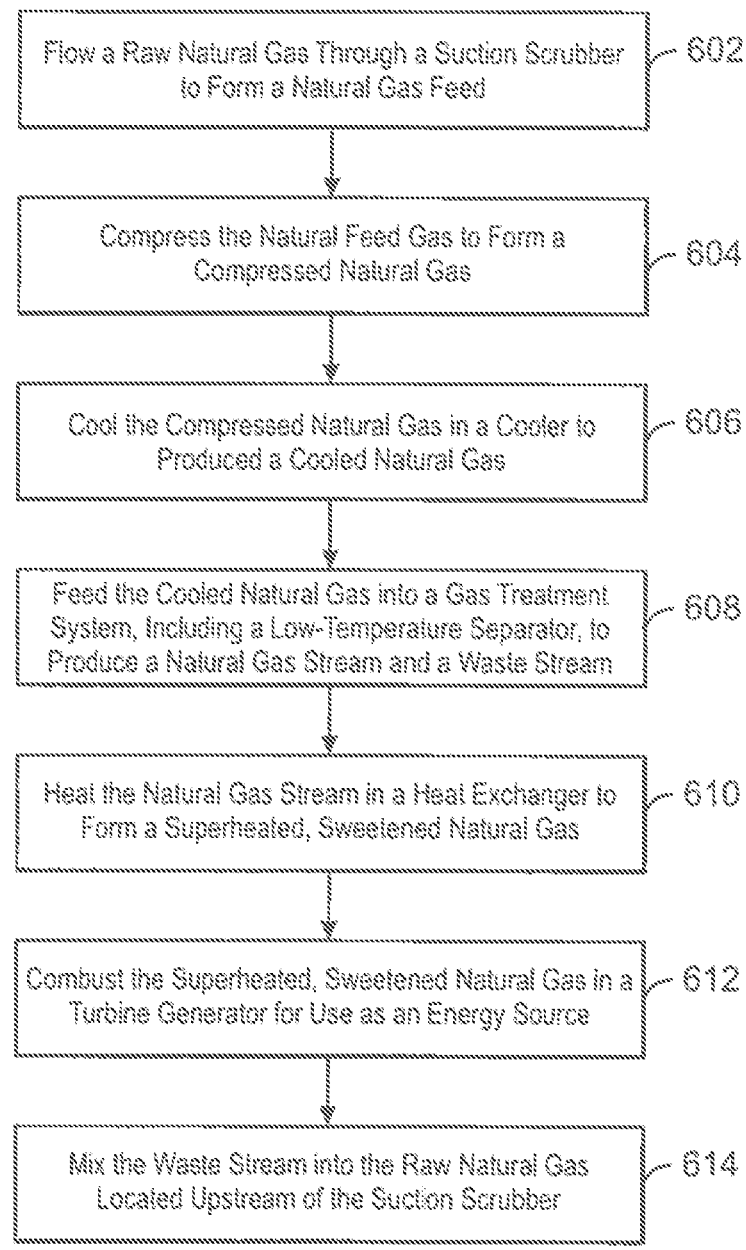
FIG. 6 is a block diagram for a method of producing a fuel gas stream from a compressed hydrocarbon stream in accordance with one or more embodiments of the present disclosure.

FIG. 6 is a block diagram 600 for a method of producing a fuel gas stream from a compressed natural gas. At block 602, a raw natural gas may flow into a suction scrubber to form a natural gas feed. At block 604, the natural feed gas may be compressed to form a compressed natural gas. At block 606, the compressed natural gas may be cooled to produce a cooled natural gas. At block 608, the cooled natural gas may be fed into a gas treatment system, where the system may include a low-temperature separator. The low-temperature separator may separate the cooled natural gas to produce a natural gas stream and a waste stream. The gas treatment system may additionally include a dehydrator, an expansion scrubber, and a cryogenic expander. At block 610, the natural gas stream may be heated in a heat exchanger to form a superheated, sweetened natural gas. At block 612, the superheated, sweetened natural gas may be combusted in a turbine generator for use as an energy source. At block 614, the waste stream may be mixed with a raw natural gas stream located upstream of a suction scrubber.

Raw natural gas produced from offshore platforms may be processed to remove contaminants and other impurities. The contaminants may include hydrogen sulfide, carbon dioxide, water, nitrogen, mercury, mercaptans, among others. In addition, the contaminants may include heavier hydrocarbons or natural gas liquids (NGLs) including ethane, propane, butane, and natural gasoline. The non-removal of such contaminants may cause damage to production equipment, thus possibly leading to increased maintenance cost or equipment failure. A fuel system may separate and remove the contaminants to provide a lean fuel gas, where a portion of the lean fuel gas may be combusted in a turbine generator to provide energy to various equipment on a remote offshore platform. The percentage of the lean fuel gas combusted in the turbine generator may be less than 20%, less than 15%, less than 10%, or less than 5% of the total amount of lean fuel gas produced by the fuel system. The remaining portion of the lean fuel gas may be recycled into an inlet of raw natural gas for continued purification.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for producing a fuel gas stream, comprising:
   flowing a raw gas stream through a suction scrubber to form a feed gas stream;
   compressing the feed gas stream to form a compressed gas stream;
   cooling the compressed gas stream in a cooler to produce a cooled gas stream;
   feeding the cooled gas stream into a gas treatment system, using a turboexpander, to produce a conditioned gas and a waste stream;
   heating the conditioned gas in a heat exchanger, wherein the conditioned gas is a superheated, sweetened gas;
   burning the conditioned gas in a turbine generator; and
   mixing the waste stream into the raw gas stream upstream of the suction scrubber.

2. The method of claim 1, comprising separating condensed liquids from a cooled gas stream to form a flash stream, wherein the flash stream is fed into a raw gas stream upstream of a suction scrubber.

3. The method of claim 1, comprising dehydrating a cooled gas stream, within a gas treatment system, to produce a dry gas stream and a waste water stream, wherein the waste water stream is fed into a raw gas stream upstream of a suction scrubber.

4. The method of claim 1, comprising feeding a portion of a cold vapor stream into a regeneration gas separator to produce a regeneration liquids stream and a regeneration gas stream, wherein the regeneration liquids stream is fed into the raw gas stream upstream of the suction scrubber.

5. The method of claim 1, comprising feeding a portion of a cold vapor stream into a cryogenic expander, wherein a contaminant rich liquid is produced.

6. The method of claim 1, comprising feeding a conditioned gas into a compressor before heating.

7. The method of claim 1, comprising pumping a waste stream into a raw gas stream upstream of a suction scrubber.

8. The method of claim 1, comprising heating a waste stream and a regeneration gas stream in a heat exchanger before entering a suction scrubber.

9. The method of claim 1, comprising heating a conditioned gas, a waste stream, and a regeneration gas stream in a cooling water loop after heating in a heat exchanger.

10. A system for producing a fuel gas stream, comprising:
    a suction scrubber to form a feed gas stream from a raw gas stream;
    a compressor to form a compressed gas stream from the feed gas stream;
    a cooling water system to cool the compressed gas stream to produce a cooled gas stream;
    a gas treatment system, comprising an expansion device and a low temperature separation step, to remove contaminants from the cooled gas stream to produce a fuel gas and a waste stream, wherein the waste stream is mixed into the raw gas stream upstream of the suction scrubber;
    a heat exchanger to superheat the fuel gas to produce a superheated, sweetened gas; and
    a turbine generator to combust the superheated, sweetened gas.

11. The system of claim 10, wherein a compressed gas stream is fed into a cooling water system from at least about 1,900 psia to produce a cooled gas stream.

12. The system of claim 10, wherein a cooling water system uses water or a glycol/water mixture to cool a compressed gas stream to reduce moisture content.

13. The system of claim 10, comprising a vapor/liquid separator to condense and remove liquids from a compressed gas stream to produce a flash stream that is fed into a raw gas stream upstream of a suction scrubber.

14. The system of claim 10, wherein a gas treatment system comprises a dehydration section, a scrubber section, and a cryogenic expander section.

15. The system of claim 10, comprising a dehydration section configured to remove liquids from a cooled gas stream to form a waste water stream, wherein a waste water stream is fed into a raw gas stream upstream of a suction scrubber.

16. The system of claim 10, comprising an expansion device configured to remove condensed liquids from a cooled gas stream to form a cold vapor stream and a liquid stream, wherein the liquid stream is fed into a raw gas stream upstream of a suction scrubber.

17. The system of claim 10, comprising a regeneration gas separator to separate a portion of a cold vapor stream to produce a regeneration gas stream and a regeneration liquids stream, wherein the regeneration liquids stream is fed into a raw gas stream upstream of a suction scrubber.

18. The system of claim 10, comprising a compressor to compress a fuel gas before heating.

19. The system of claim 10, wherein a waste stream comprises contaminants, water, or in any combination thereof, wherein a pump increases a pressure of the waste stream for injection into a raw gas stream upstream of a suction scrubber.

20. The system of claim 10, wherein a heat exchanger heats a waste stream and a regeneration gas stream before entering a suction scrubber.

21. The system of claim 10, comprising a cooling water loop to heat a fuel gas, a waste stream, and a regeneration gas stream after heating in a heat exchanger.

22. A method for producing a fuel gas from a compressed natural gas, comprising:
    flowing a raw natural gas through a suction scrubber to form a natural gas feed;
    compressing the natural feed gas to form a compressed natural gas;
    cooling the compressed natural gas in a cooler to produce a cooled natural gas;
    feeding the cooled natural gas into a gas treatment system, comprising a low-temperature separator, to produce a natural gas stream and a waste stream;
    heating the natural gas stream in a heat exchanger to form a superheated, sweetened natural gas;
    combusting the superheated, sweetened natural gas in a turbine generator for use as an energy source; and
    mixing the waste stream into the raw natural gas located upstream of the suction scrubber.

23. The method of claim 22, wherein a portion of cooled natural gas directed into a gas treatment system includes less than about 15%, about 10%, about 5%, or less of the total amount of the compressed natural gas.

24. The method of claim 22, comprising removing condensed liquids from a cooled natural gas stream to form a flash stream, wherein the flash stream is fed into an upstream compression scrubber.

25. The method of claim 22, comprising dehydrating a cooled natural stream, within a gas treatment system, to produce a cold natural gas stream and a waste water stream, wherein the waste water stream is fed into a raw gas stream upstream of a suction scrubber.

26. The method of claim 22, comprising removing condensed liquids from a cooled natural gas stream in an expansion device, within a gas treatment system, to produce a cold vapor natural gas and a liquid stream, wherein the liquid stream is fed into a raw gas stream upstream of a suction scrubber.

27. The method of claim 22, comprising feeding a portion of a cold vapor natural gas into a regeneration gas separator to generate a regeneration gas stream and a regeneration liquids stream, wherein the regeneration liquids stream is fed into the raw gas stream upstream of the suction scrubber.

28. The method of claim 22, comprising feeding a natural gas stream into a compressor before heating and wherein a waste stream is pumped into a raw gas stream upstream of a suction scrubber.

29. The method of claim 22, comprising heating a waste stream and a regeneration gas stream in a heat exchanger before flowing the waste stream and the regeneration gas into a suction scrubber.

30. The method of claim 22, comprising heating a natural gas stream, a reject stream, and a regeneration gas stream using a cooling water loop.

31. The method of claim 22, wherein a portion of a superheated, sweetened natural gas directed into a turbine generator may include less than about 15%, about 10%, about 5%, or less of the total amount of superheated, sweetened natural gas that is generated.

32. The method of claim 22, wherein about 15%, about 10%, about 5%, or less of the compressed gas stream is directed into the gas treatment system.

33. The method of claim 24, wherein about 15%, about 10%, about 5%, or less of the compressed gas stream is directed into the gas treatment system.

* * * * *